United States Patent
Tanaka et al.

(10) Patent No.: US 7,574,554 B2
(45) Date of Patent: Aug. 11, 2009

(54) STORAGE SYSTEM AND DATA PROTECTION METHOD THEREFOR

(75) Inventors: Katsuya Tanaka, Kokubunji (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 11/503,050

(22) Filed: Aug. 11, 2006

(65) Prior Publication Data

US 2008/0022163 A1  Jan. 24, 2008

(51) Int. Cl.
*G06F 12/00* (2006.01)
(52) U.S. Cl. ...................................... 711/103
(58) Field of Classification Search ............... None
See application file for complete search history.

(56) References Cited

U.S. PATENT DOCUMENTS

| | | | |
|---|---|---|---|
| 5,606,529 A | 2/1997 | Honma et al. | |
| 5,956,743 A * | 9/1999 | Bruce et al. | 711/103 |
| 5,987,563 A | 11/1999 | Itoh et al. | |
| 6,119,245 A | 9/2000 | Hiratsuka | |
| 7,409,492 B2 * | 8/2008 | Tanaka et al. | 711/103 |
| 2004/0148461 A1 | 7/2004 | Steinmetz et al. | |
| 2004/0186946 A1 | 9/2004 | Lee | |
| 2005/0036381 A1 | 2/2005 | Hassner | |

FOREIGN PATENT DOCUMENTS

| | | |
|---|---|---|
| EP | 0 392 895 A2 | 10/1990 |
| JP | 2001-202295 A | 7/2001 |
| WO | WO 02/19334 A | 3/2002 |

* cited by examiner

*Primary Examiner*—Brian R Peugh
(74) *Attorney, Agent, or Firm*—Sughrue Mion, PLLC

(57) ABSTRACT

To detect an address error in flash memory using a different data management unit from that in a hard disk drive. In cache memory, data read/written from/to a flash memory chip is managed in units of first data lengths. A page, which is the data management unit in a flash memory chip, includes a data section of a second data length from/to which a storage controller can read/write data; and a redundant section. When writing data, the storage controller creates a protection code enabling identification of a write destination page address, divides the data in the cache memory, which is managed in units of first data lengths, into pieces so that the size of each set composed of a piece of the divided write data and its protection code will be of a second data length, and writes the respective sets in a flash memory chip in units of second data lengths.

15 Claims, 14 Drawing Sheets

| PDEV | VENDOR NAME | TYPE | MEDIA TYPE | PAGE DATA SECTION SIZE |
|---|---|---|---|---|
| P00 | AA | FM-AA-02 | 1 | 2048 |
| P01 | AA | FM-AA-01 | 1 | 4096 |
| | | | | |
| H00 | BB | HD-BB-01 | 0 | 520 |
| H01 | BB | HD-BB-02 | 0 | 520 |
| | | | | |

| VENDOR NAME | TYPE | MEDIA TYPE | PAGE DATA SECTION SIZE |
|---|---|---|---|
| AA | FM-AA-01 | 1 | 4096 |
| AA | FM-AA-02 | 1 | 2048 |
| | | | |
| BB | HD-BB-01 | 0 | 520 |
| BB | HD-BB-02 | 0 | 520 |
| | | | |

902 903 904 905

STORAGE SYSTEM AND DATA PROTECTION METHOD THEREFOR

CROSS-REFERENCES TO RELATED APPLICATIONS

This application relates to and claims the benefit of priority from Japanese Patent Application No. 2006-178487, filed on Jun. 28, 2006, the entire disclosure of which is incorporated herein by reference.

BACKGROUND

1. Field of the Invention

The invention generally relates to storage technology, and, more specifically, to a storage system using flash memory as storage media, and to a data protection method for that storage system.

2. Description of Related Art

Data storage systems usually have randomly accessible nonvolatile storage media. Examples of the randomly accessible nonvolatile storage media include magnetic disks and optical disks. Recent mainstream storage systems include many small disk drives. Also, as semiconductor technology progresses, block-erasable nonvolatile semiconductor memory has been developed. Block-erasable nonvolatile semiconductor memory is, for example, flash memory. Storage systems using flash memory as storage media are superior to storage systems having many small disk drives in service life, power-saving, and access time.

Flash memory is described in detail below. In flash memory, data is erased in units of blocks and read/written in units of pages, blocks and pages both being memory areas. It is a characteristic of flash memory that data cannot be directly updated. More specifically, when updating data in flash memory, valid data stored in the flash memory is first copied to another location. Then, the data is erased in block units. Then, new data is written in the freshly-erased block where the old data had been previously stored.

More specifically, with flash memory, it is possible to set bit '1' to '0' but not '0' to '1.' Therefore, to update data in flash memory, block(s) are erased. As explained above, data update in flash memory requires erasing of blocks.

However, the time required for erasing one block in flash memory is longer than the time required for writing data in one page, by an order of magnitude. Accordingly, if one block is erased every time data in one page is updated, the data update capacity of flash memory deteriorates to a considerable extent. In other words, with flash memory, it is necessary to write data with an algorithm that enables concealment of erase times.

In addition, flash memory has a finite number of block-erase cycles. For example, one hundred thousand erase cycles are guaranteed per one block. Accordingly, there is a problem with blocks with a large number of erase cycles due to a concentration of data update, in that the data can no longer be erased and the blocks cannot be used anymore. Accordingly, storage systems using flash memory as storage media must incorporate wear-leveling algorithms ensuring that erasing will not be concentrated on a certain storage block.

When writing data in a flash memory module, address translation is performed for erase-time concealment and wear-leveling. A flash memory module has one or more flash memory chips and a memory controller for controlling data transfer to the flash memory chip(s). In order to avoid concentration of data writing on a particular physical address, the memory controller has the function of converting a logical address—a write destination address—it receives from a host computer or the controller of a storage apparatus to a physical address, which is a write destination address in the flash memory chip. Here, the problem is an address error that may occur in the memory controller. If the memory controller causes an error when converting a logical address to a physical address, data is written in the wrong physical address. In other words, the write data itself has no problems or errors, but because it is written in the wrong physical address, there is a possibility that the data may not be read when desired.

The technique disclosed in Japanese Patent Laid-Open Publication No. 2001-202295 has been known as a method for solving the foregoing problem. With this technique, when using hard disk drives as storage media, data is protected from address errors in the storage media. More specifically, when writing data in a hard disk drive, the data is given protection codes including logical address values, the protection codes corresponding to the respective logical data blocks in the hard disk drive. When reading data from the hard disk drive, the protection codes given to the respective logical data blocks are checked.

Moreover, US Patent Publication No. 2004-0148461A1 discloses a storage system that guarantees compatibility between storage media having different data management units.

In flash memory, data is read/written using addresses mapped onto each page. The page size differs depending on the chip type and generation. For example, the page size of a current flash memory chip is 528 bytes or 2112 bytes and the size of the memory area data actually can be written in from outside a flash memory module is 512 bytes or 2048 bytes in the page. The rest of the page (e.g., 528 bytes minus 512 bytes, equal to 16 bytes; and 2112 bytes minus 2048 bytes, equal to 64 bytes) is used as a redundant section for storing information for a memory controller to manage addresses in page units and error correction codes for the memory controller to correct errors. With the trend in increasing flash memory capacity, the page size is expected to increase in size.

Flash memory modules intended to substitute for hard disk drives as storage media in storage systems have hard disk drive-compatible interfaces. Storage controllers recognize hard disk drive-compatible flash memory modules as hard disk drives each having 512 bytes per sector. In other words, the storage controllers cannot recognize the address-converted data units in the flash memory modules with the hard disk drive-compatible interfaces. Moreover, the page size differs depending on the type and generation of the flash memory chips implemented in the flash memory modules. In the foregoing conventional measures against address errors, it is necessary for storage controllers to add, to each data unit whose address is to be converted, a protection code to perform data writing.

However, as already mentioned above, with the flash memory modules having hard disk drive-compatible interfaces or flash memory modules having unclear chip specifications, the size of data to be protected from address errors is unclear. For this reason, it is difficult to protect data from address errors in the flash memory modules using conventional techniques.

In a hard disk drive requiring high reliability, the capacity of one sector is 520 bytes and data and protection codes are managed as a set. Meanwhile, in flash memory, the sizes of data that can be written in one page are multiples of 512 bytes, except for the memory areas used for management by the memory controller. If the data managed in 520-byte units is directly written in page(s) in the flash memory, the 520-byte pieces of data are written in the flash memory, sometimes spreading across the page boundaries. This means that the data and its protection code in one 520-byte piece are written in different pages and the data separated from the protection code is no longer protected from address errors. Accordingly, it is difficult to protect data spreading across the page boundaries from address errors using conventional techniques.

Embodiments of this invention were devised in light of the foregoing problems, and aims to provide a storage system able to correct address errors in flash memory modules that use different data management units from those used in hard disk drives; and a data protection method for this storage system.

SUMMARY

In order to solve the foregoing problems, an aspect of this invention provides a storage system including: one or more flash memory modules each having one or more flash memory chips and a memory controller that controls reading/writing of data from/to the flash memory chips; and a storage controller having cache memory that temporarily stores data read/written from/to one or more of the flash memory chips. In the cache memory, data read/written from/to the flash memory chips is managed in units of first data lengths. In the flash memory modules, the data read/written from/to the flash memory chips is managed in page units. The memory area of one page includes a memory area of a second length from/to which the storage controller can read/write data, and a memory area for a redundant section. When writing data in a flash memory chip, the storage controller creates a protection code enabling identification of address information for a write destination page; divides the data in the cache memory, which is managed in units of first data lengths, into pieces so that the size of each set composed of a piece of the divided write data and its protection code will be of the second data length, and writes the respective sets of the pieces of write data and protection codes in the flash memory chip in units of second data lengths. The storage controller compares the address information identified with the protection codes attached to the data read from the flash memory chip with the address information for the data that is intended to be read, and checks whether or not there is a read error. With a storage system having the foregoing configuration, an address error in a flash memory module using different data management units from those in a hard disk drive can be detected.

According to a preferred embodiment of this invention, the storage controller further includes a database storing relationships between the specifications of the flash memory modules and the second data lengths of the same. Because flash memory modules with different specifications have different second data lengths, if the storage controller has a database storing the relationships between the flash memory modules' specifications and their second data lengths, the second data lengths can be adjusted according to the specifications of the flash memory modules connected to the storage controller.

According to the preferred embodiment of this invention, the storage areas provided by flash memory modules are structured according to RAID. When an address error occurs in the data in any one of the flash memory modules, the storage controller rebuilds the data having the address error in units of the second data lengths using the data stored in the other flash memory modules belonging to the same RAID group as the flash memory module storing the data having the address error; and overwrites the data having the address error with the rebuilt data. With this configuration, even if an address error occurs in the data in any flash memory module, that data can be rebuilt.

According to the preferred embodiment of this invention, any one of the protection codes includes write-time information. With this configuration, when access is made to sequential data, the sequential data can be protected from address errors.

According to the preferred embodiment of this invention, any one of the protection codes includes an error detection code or correction code for protecting data of the second data length. Examples of the error detection code and correction code include a CRC code, LRC code, and a Hamming code.

According to another aspect of this invention, the storage system includes: one or more flash memory modules each having one or more flash memory chips and a memory controller that controls reading/writing of data from/to the flash memory chips; and a storage controller having cache memory that temporarily stores data read/written from/to one or more of the flash memory chips. In the cache memory, data read/written from/to the flash memory chips is managed in units of first data lengths. In the flash memory modules, the data read/written from/to the flash memory chips is managed in page units. The memory area of one page includes a memory area of a second length from/to which the storage controller can read/write data, and a memory area for a redundant section. The storage controller has a media identification unit that identifies the type of a storage medium connected thereto. If a storage medium connected to the storage controller is a flash memory module, when writing data in a flash memory chip, the storage controller creates a protection code enabling identification of address information for a write destination page; divides the data in the cache memory, which is managed in units of first data lengths, into pieces so that the size of each set composed of a piece of the divided write data and its protection code will be of the second data length, and writes the respective sets of the pieces of the write data and protection code in the flash memory chip in units of second data lengths. The storage controller compares the address information identified with the protection codes attached to the data read from the flash memory chip with the address information for the data that is intended to be read, and checks whether or not there is a read error. With this configuration, the storage controller can judge the types of storage media connected thereto and detect address errors in flash memory modules using different data management units from those in hard disk drives.

In the preferred embodiment of this invention, the first data length is the sector length of a hard disk drive.

In the preferred embodiment of this invention, data of the first data length includes data and a protection code enabling identification of address information of a write destination hard disk drive for that data.

In the preferred embodiment of this invention, the storage controller further includes a database storing relationships between the specifications of the storage media and the second data lengths of the same. Because storage media with different specifications have different second data lengths, if the storage controller has a database storing relationships between the storage media's specifications and their second data lengths, the second data lengths can be adjusted according to the specifications of the storage media connected to the storage controller.

The storage system where a data protection method according to this invention is applied includes: one or more flash memory modules each having one or more flash memory chips and a memory controller that controls reading/writing of data from/to the flash memory chips; and a storage controller having cache memory that temporarily stores data read/written from/to one or more of the flash memory chips.

The memory area of one page includes: a memory area of a second length from/to which the storage controller can read/write data; and a memory area for a redundant section. This method includes: a step of managing the data read/written from/to a flash memory chip in units of first data lengths in the cache memory; a step of creating a protection code enabling identification of address information for a write destination page, when writing data in a flash memory chip; a step of dividing the data in the cache memory, which is managed in units of first data lengths, into pieces so that the size of each set composed of a piece of the divided write data and its protection code will be of the second data length; a step of writing the respective sets of the pieces of the write data and protection codes in the flash memory chip in units of second data lengths; and a step of comparing the address information identified with the protection codes attached to the data read from the flash memory chip with the address information for the data that is intended to be read and checking whether or not there is a read error. With this data protection method, address errors in flash memory modules using different data management units from those in disk drives can be detected.

According to an aspect of this invention, address errors in flash memory modules using data management units different from those in disk drives can be detected.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 9 is an explanatory diagram showing the information stored in a PDEV management table.

FIG. 10 is an explanatory diagram showing the information stored in a media database.

DETAILED DESCRIPTION OF PREFERRED EMBODIMENT

Figure 1:
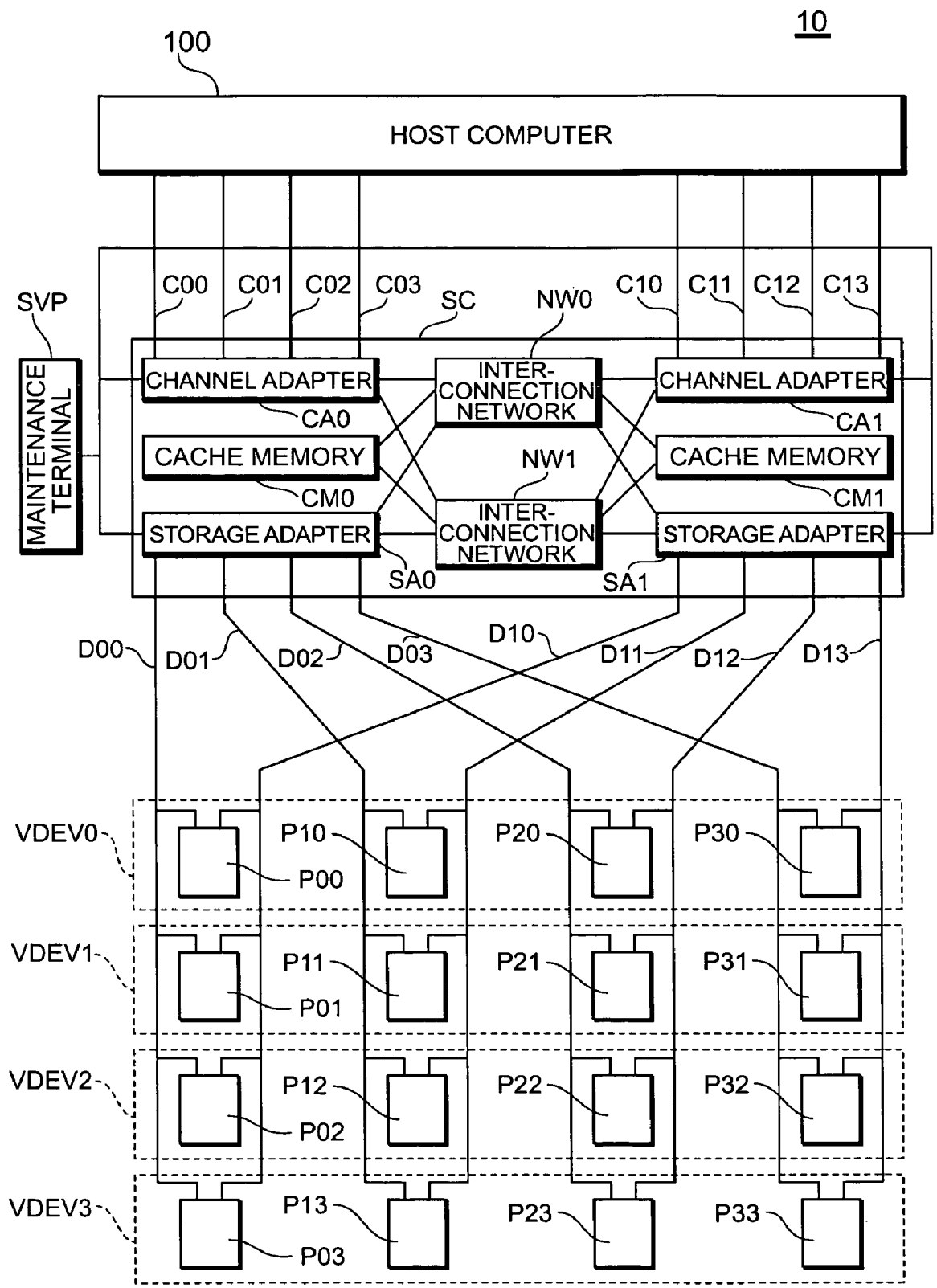
FIG. 1 is a diagram showing the hardware structure of a storage system according to an embodiment of this invention.

An embodiment of the present invention will be described below with reference to the attached drawings. FIG. 1 shows the hardware structure of a storage system 10 according to this embodiment. This storage system 10 has a storage controller SC and flash memory modules P00 to P33. The storage controller SC has channel adapters CA0 and CA1; cache memory CM0 and CM1; storage adapters SA0 and SA1; and interconnection networks NW0 and NW1.

Incidentally, FIG. 1 shows an example where the storage controller SC has two channel adapters CA0 and CA1, two cache memory CM0 and CM1, and two storage adapters SA0 and SA1, however, there may be any number of components.

The interconnection networks NW0 and NW1 are, for example, switches that connect the respective components in the storage controller SC to one another. More specifically, they connect the channel adapter CA0, cache memory CM0 and storage adapter SA0 to one another. Likewise, they also connect the channel adapter CA1, cache memory CM1 and storage adapter SA1 to one another.

The channel adapter CA0 is connected to a host computer 100 via channels C00, C01, C02 and C03. Likewise, the channel adapter CA1 is connected to the host computer 100 via channels C10, C11, C12 and C13. The host computer 100 is, for example, a personal computer, work station, or mainframe computer and requests data reading from and writing to the storage system 10. The cache memory CM0 and CM1 temporarily store data they receive from the channel adapters CA0 and CA1 or storage adapters SA0 and SA1.

The storage adapter SA0 is connected to the flash memory modules P00 to P33. More specifically, the storage adapter SA0 is connected to the flash memory modules P00 to P03 via a channel D00. It is also connected to the flash memory modules P10 to P13 via a channel D01. It is also connected to the flash memory modules P20 to P23 via a channel D02, and connected to flash memory modules P30 to P33 via a channel D03.

Likewise, the storage adapter SA1 is connected to the flash memory modules P00 to P33. More specifically, it is connected to flash memory modules P00 to P03 via a channel D10. It is also connected to the flash memory modules P10 to P13 via a channel D11. It is also connected to the flash memory modules P20 to P23 via a channel D12, and connected to the flash memory modules P30 to P33 via a channel D13.

The channel adapters CA0 and CA1 and storage adapters SA0 and SA1 are connected to a maintenance terminal SVP. This maintenance terminal SVP sends configuration information input from the administrator of the storage system 10 to the channel adapters CA0 and CA1 and/or storage adapters SA0 and SA1.

Incidentally, the storage system 10 may have only one adapter instead of having the storage adapters SA0 and channel adapter CA0. In that case, that one adapter carries out the processing the storage adapter SA0 and channel adapter CA0 usually perform.

VDEV 0 to VDEV 3 are RAID (Redundant Arrays of Inexpensive Disks) groups. For example, the RAID group VDEV 0 is composed of the flash memory modules P00, P10, P20 and P30. When an error occurs in one of the flash memory modules belonging to the RAID group VDEV 0, e.g., in the flash memory module P00, and the data cannot be read from the module P00, the data can be rebuilt using the other flash memory modules P10, P20 and P30 in the RAID group VDEV 0.

Figure 2:
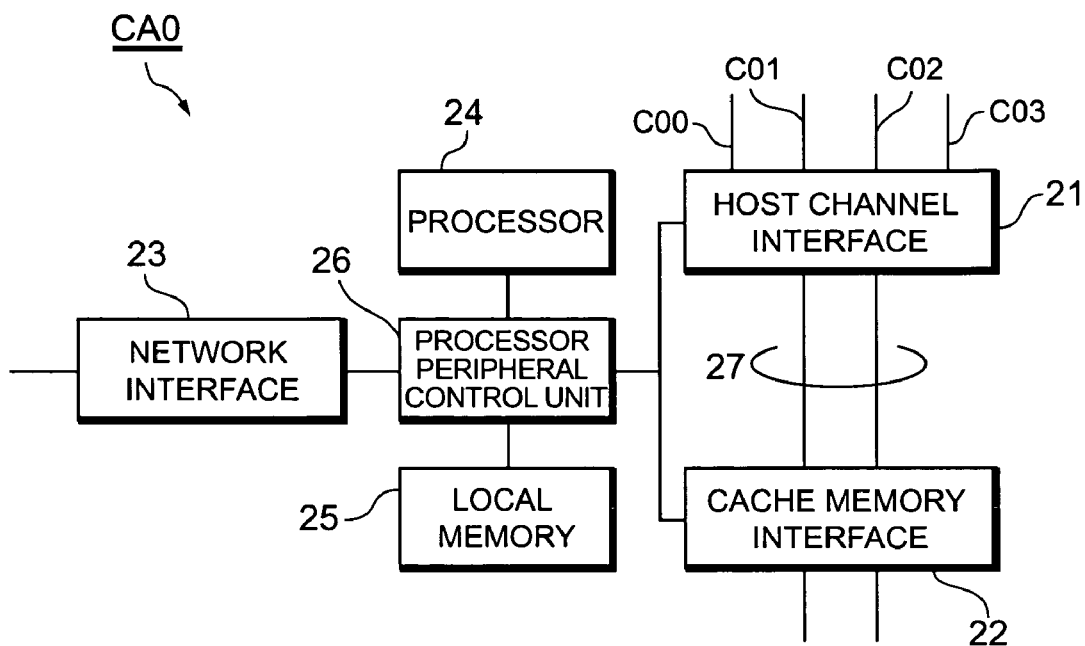
FIG. 2 is a diagram showing the hardware structure of a channel adapter.

FIG. 2 shows the hardware structure of the channel adapter CA0. The channel adapter CA0 has a host channel interface 21, cache memory interface 22, network interface 23, processor 24, local memory 25 and processor peripheral control unit 26.

The host channel interface 21 is an interface that connects the channel adapter CA0 to the host computer 100 via the channels C00, C01, C02 and C03. It converts data transfer protocols in the channels C00, C01, C02 and C03 to data transfer protocols for the storage controller SC, or vice versa.

The cache memory interface 22 is an interface that connects the channel adapter CA0 to the interconnection networks NW0 and NW1.

The network interface 23 is an interface that connects the channel adapter CA0 to the maintenance terminal SVP.

Incidentally, the host channel interface 21 and cache memory interface 22 are connected to each other via a signal line 27.

The processor 24 carries out various kinds of processing by executing the programs stored in the local memory 25. More specifically, the processor 24 controls data transfer between the host computer 100 and interconnection networks NW0 and NW1.

The local memory 25 stores the programs the processor 24 executes. It also stores the tables the processor 24 refers to. The tables referred to by the processor 24 are set or changed by the administrator. More specifically, the administrator inputs information regarding table setup or change(s) in table(s) in the maintenance terminal SVP. The maintenance terminal SVP sends the input information to the processor 24 via the network interface 23. The processor 24 then creates a table or makes change(s) in the table(s) based on the information it receives. Then, the processor 24 stores the table in the local memory 25.

The processor peripheral control unit 26 controls data transfer between the host channel interface 21, cache memory interface 22, network interface 23, processor 24 and local memory 25. An example of the processor peripheral control unit 26 is a chipset.

Incidentally, the hardware structure of the channel adapter CA1 is the same as that of the channel adapter CA0, so explanations for the hardware structure of the channel adapter CA1 will be omitted.

Figure 3:
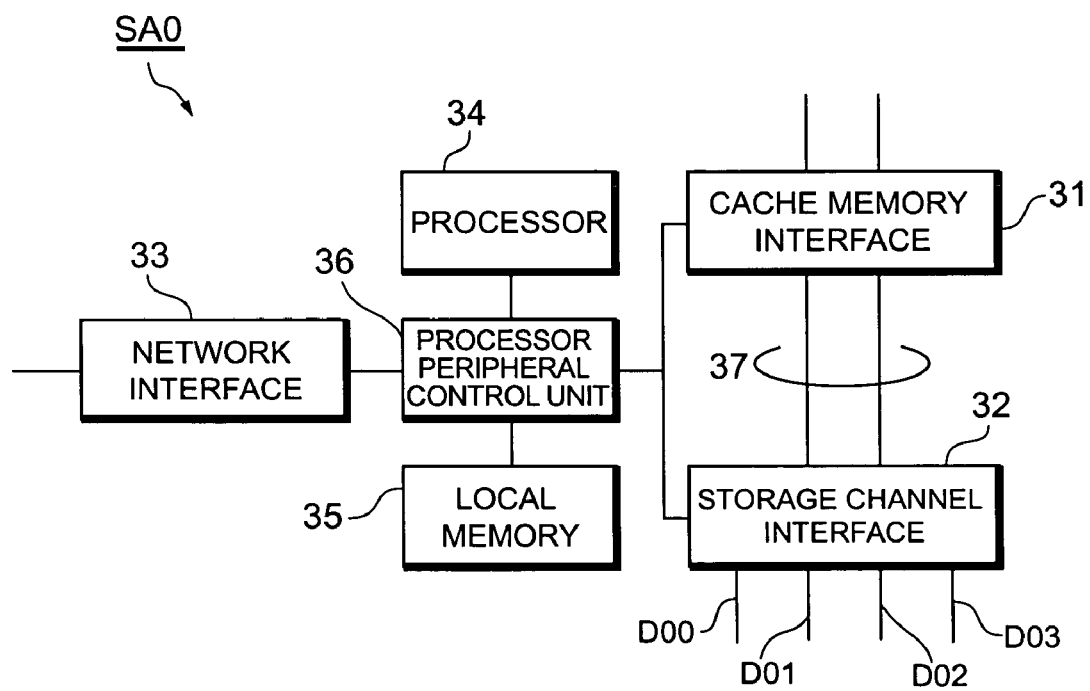
FIG. 3 is a diagram showing the hardware structure of a storage adapter.

FIG. 3 shows the hardware structure of the storage adapter SA0. The storage adapter SA0 has a cache memory interface 31, storage channel interface 32, network interface 33, processor 34, local memory 35 and processor peripheral control unit 36.

The cache memory interface 31 is an interface that connects the storage adapter SA0 to the interconnection networks NW0 and NW1.

The storage channel interface 32 is an interface that connects the storage adapter SA0 to the channels D00, D01, D02 and D03. It converts data transfer protocols in the channels D00, D01, D02 and D03 to data transfer protocols for the storage controller SC, or vice versa.

Incidentally, the cache memory interface 31 and storage channel interface 32 are connected to each other via a signal line 37.

The network interface 33 is an interface that connects the storage adapter SA0 to the maintenance terminal SVP.

The processor 34 carries out various kinds of processing by executing the programs stored in the local memory 35.

The local memory 35 stores the programs the processor 34 executes. It also stores the tables the processor 34 refers to. The tables referred to by the processor 34 are configured or changed by the administrator. More specifically, the administrator inputs information regarding table setup or change(s) in table(s) into the maintenance terminal SVP. The maintenance terminal SVP sends the input information to the processor 34 via the network interface 33. The processor 34 then creates a table or makes change(s) in the table(s) based on the information it receives. Then, the processor 34 stores the table in the local memory 35.

The processor peripheral control unit 36 controls data transfer between the cache memory interface 31, storage channel interface 32, network interface 33, processor 34, and local memory 35. An example of the processor peripheral control unit 36 is a chipset.

Incidentally, the hardware structure of the storage adapter SA1 is the same as that of the storage adapter SA0, so explanations for the hardware structure of the storage adapter SA1 will be omitted.

Figure 4:
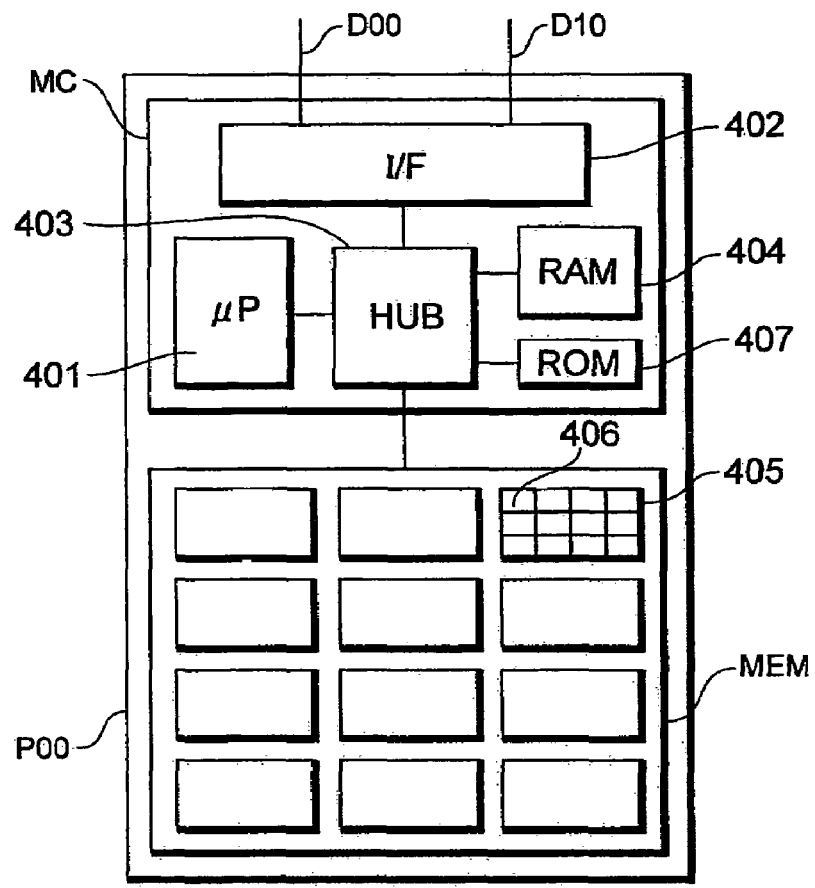
FIG. 4 is a diagram showing the hardware structure of a flash memory module.

FIG. 4 shows the hardware structure of the flash memory module P00. The flash memory module P00 has a memory controller MC and flash memory MEM. The flash memory MEM stores data. The memory controller MC controls data reading, writing, and erasing from/to the flash memory MEM. The memory controller MC has a processor (µP) 401, interface unit (I/F) 402, data transfer unit (HUB) 403, memory (RAM) 404, and memory (ROM) 407. The flash memory MEM has a plurality of flash memory chips 405. Each flash memory chip 405 includes a plurality of blocks 406 each storing data. The blocks 406 are units the memory controller MC erases data in. Each block 406 includes a plurality of pages. Pages are units the memory controller MC reads/writes data in.

Incidentally, the pages are classified into valid pages, invalid pages, unused pages, and bad pages. Valid pages store valid data. Invalid pages store invalid data. Unused pages store no data. Bad pages cannot be used physically for reasons such as the storage elements in those bad pages being broken.

The interface unit 402 is connected to the storage adapter SA0 in the storage controller SC via the channel D00. It is also connected to the storage adapter SA1 in the storage controller SC via the channel D10. It receives commands from the storage adapters SA0 and SA1. The commands from the storage adapters SA0 and SA1 are, for example, SCSI commands.

More specifically, the interface unit 402 receives data from the storage adapters SA0 and SA1. Then, it stores that data in the memory 404. It also sends the data stored in the memory 404 to the storage adapters SA0 and SA1. The interface unit 402 serves as an interface compatible with hard disk drives. Accordingly, the storage adapters SA0 and SA1 recognize the flash memory modules P00 to P33 as, for example, hard disk drives where one sector has 512 bytes. The storage system 10 can have both flash memory modules and hard disk drives as data-storing media.

The memory 404 is, for example, dynamic random access memory that enables high-speed reading/writing. It temporarily stores data the interface unit 402 sends/receives. Meanwhile, the memory 407 is a nonvolatile memory and stores programs the processor 401 executes. The programs executed by the processor 401 are loaded from the memory 407 into the memory 404 at the startup of the storage system 10 so that the processor 401 can execute the programs. The memory 404 also stores a table the processor 401 refers to.

The table referred to by the processor 401 is, for example, an address translation table for translating a logical address in flash memory MEM to a physical address or vice versa. A logical address is used when access is made from outside the flash memory module P00 (e.g., the storage adapter SA0) to a page, which is a unit of data reading/writing from/to the flash memory MEM. Meanwhile, a physical address is used when the memory controller MC accesses a page.

The data transfer unit 403 is, for example, a switch, and connects the processor 401, interface unit 402, memory 404, memory 407, and flash memory MEM to one another and controls data transfer between them.

The processor 401 carries out various kinds of processing by executing the programs stored in the memory 404. For example, it refers to the address translation table in the memory 404, translates a logical address in the flash memory MEM to a physical address or vice versa, and reads/writes data from/to the flash memory MEM. The processor 401 also carries out reclamation (or 'garbage collection') (block reclamation process) and wear-leveling for the blocks 406 in the flash memory module P00.

Reclamation (block reclamation) is the reproduction of an invalid page in a block 406 to an unused page so that the block where the number of unused pages is small can be used again. More specifically, it is assumed that a reclamation target block (target block) 406 includes valid pages, invalid pages, and unused pages, and that the number of invalid pages is large. In order to increase the number of unused pages, the invalid pages have to be erased. However, data can only be erased in block units, not in page units. Therefore, the valid pages are copied to another block having empty space and the target block is erased and reproduced.

More precisely, the processor 401 copies the data stored in the valid pages in the reclamation target block (target block) 406 to an unused block. Then, it changes the logical block number of the unused block having the copied data to the logical block number of the target block. Then, it erases all the data in the target block and the reclamation is complete.

In other words, as the processor 401 writes data in the block 406, the number of unused pages in the block 406 decreases. When there is a shortage of unused pages in the block 406, the processor 401 can no longer write data in the block 406. Therefore, it carries out reclamation for the target block 406 to change the invalid pages to unused pages.

Meanwhile, wear-leveling is the leveling of the number of data erase cycles of the blocks 406. Wear-leveling makes it possible to lengthen the duration of the flash memory MEM. This is because the flash memory MEM wears out when the number of data erase cycles reaches a large number. Normally, the flash memory MEM is guaranteed ten thousand to one hundred thousand erase cycles.

Incidentally, although explanations were given only for the hardware structure of the flash memory module P00, the other flash memory modules P01 to P33 have the same hardware structures.

Figure 5:
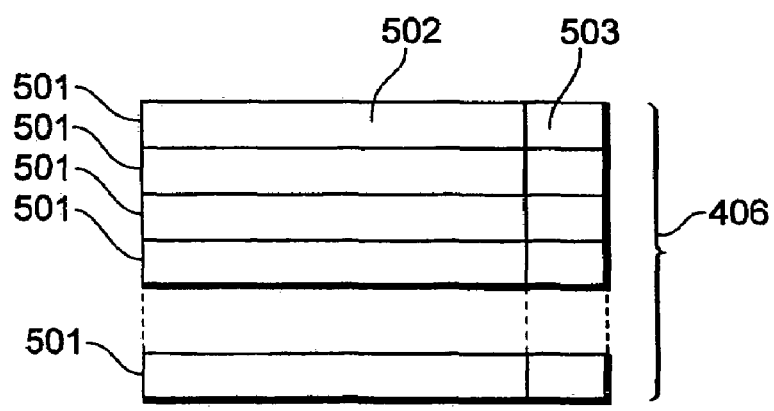
FIG. 5 is an explanatory diagram showing the block in a flash memory module.

FIG. 5 is an explanatory diagram showing a block 406 in the flash memory module P00. The block 406 includes a plurality of pages 501—numbering in the tens of pages—(e.g., 64 pages). The memory controller MC reads/writes data in page units. For example, in NAND flash memory, the memory controller MC reads data at a speed of 20 μs to 30 μs/page and writes data at a speed of 0.2 ms to 0.3 ms/page. Also, it erases data at a speed of 2 nm to 4 ms/block.

Each page 501 includes a data section 502 and redundant section 503. For example, in one page 501 of 2112 bytes, the data section 502 is 2048 bytes and the redundant section 503 is 64 bytes. This embodiment is explained giving an example of a flash memory where each page 501 is composed of 2112 bytes and the data section 502 in that page 501 is of 2048 bytes; however, the page size is not limited.

The data section 502 stores user data. The redundant section 503 stores the mapping and management information and an error correction code for the relevant page 501. The mapping and management information includes an offset address and page status. Incidentally, the offset address is a relative address in the block 406 the page 501 belongs to. The page status indicates whether the page 501 is a valid page, invalid page, unused page or in-process page. An error correction code is for detecting and correcting an error in the page 501 and is, for example, a Hamming code. Usually, only the memory controller MC can access the redundant section 503 and the storage adapters SA0 and SA1 can access only the page data section 502. In other words, logical addresses are for mapping memory spaces in the data section 502.

Because of the reclamation and wear-leveling explained above, the data written in an area in the flash memory module sometimes migrates to another area within that flash memory module, independently of instructions from the storage controller SC. The memory controller MC reflects the data migration result in the address translation table correctly, so that the storage controller SC can access the correct data.

However, if an error occurs in the relationship between a logical address and a physical address due to a defect (bug etc.) in the reclamation or wear-leveling programs or due to radiation-caused data garble in the address translation table, an error occurs in a data write destination address or data read source address in the flash memory module, and the storage controller SC cannot read correct data. In this embodiment, data can be protected properly from address errors in flash memory modules.

Figure 6:
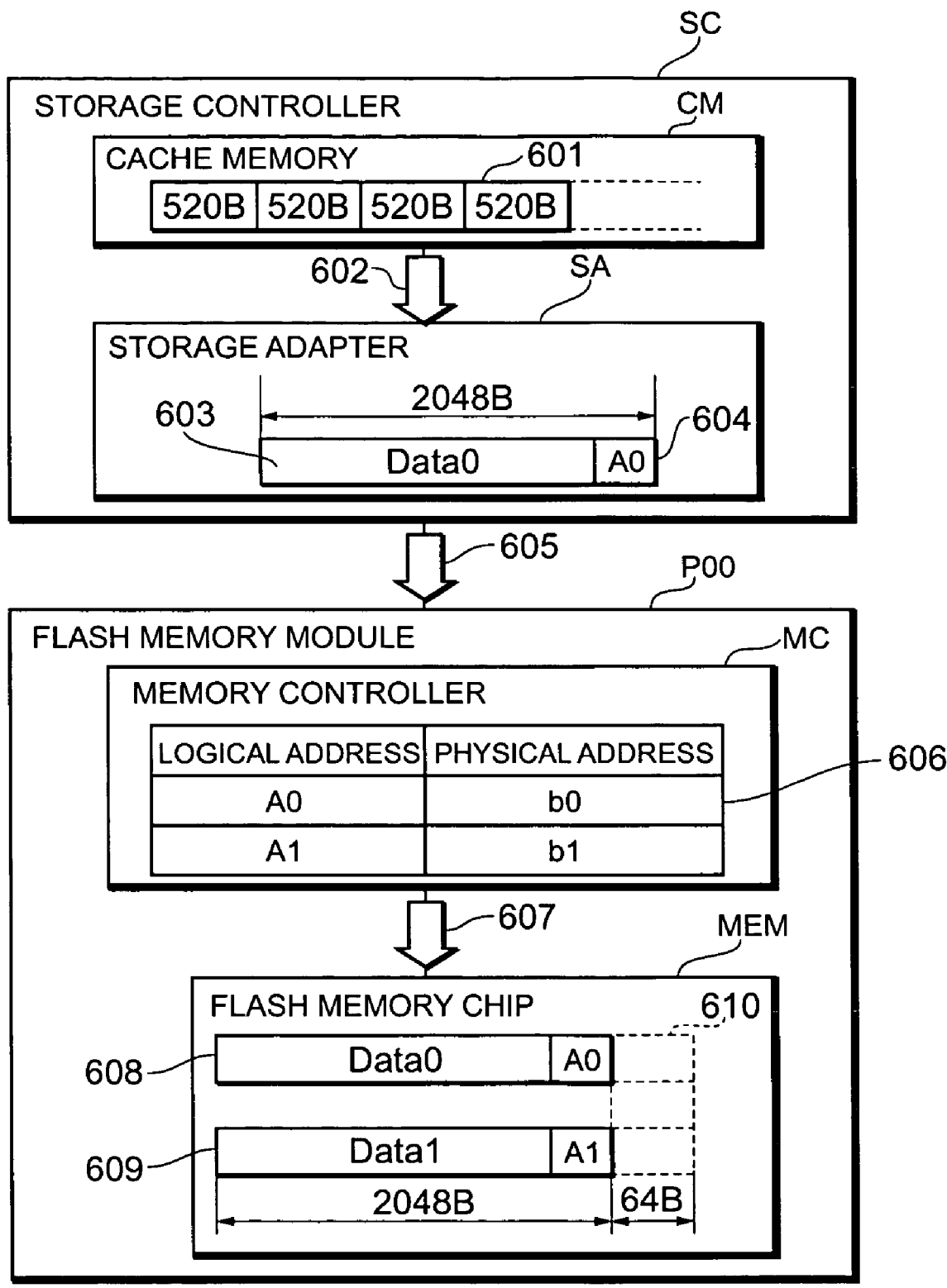
FIG. 6 is an explanatory diagram showing the outline of processing performed by a storage controller to write data in a flash memory module.

An address error detection method is explained below with reference to FIGS. 6 and 7. FIG. 6 shows the outline of the processing the storage controller SC performs to write data in the flash memory module P00. In the cache memory CM in the storage controller SC, data 601 is managed in units of sectors in hard disk drives requiring high reliability (e.g., in 520-byte units). Each 520-byte piece of data 601 is composed of 512-byte user data and an 8-byte hard disk drive protection code. The hard disk drive protection code includes the information that enables identification of address information (write address) for a data write destination hard disk drive.

For the purpose of maintaining compatibility with conventional architectures, the storage system 10 can have both flash memory modules and hard disk drives as data-storing media, and in the cache memory CM, data is managed in units of sectors in hard disk drives. Here, an address for accessing data 601 in the cache memory CM is called a cache address.

To write data in the flash memory module P00, the storage controller SC first transfers the data 601 in the cache memory CM to the storage adapter SA (Step 602). The storage adapter SA checks the size of the page data section used in the write destination flash memory module P00 and calculates the start logical address of the write destination (details will be provided below). Here, as an example, it is assumed that the logical address of the write destination is 'A0.' The storage adapter SA creates a protection code 604 which enables identification of the write destination logical address information. This protection code 604 is not necessarily a logical address and it only has to be information enabling identification of the write destination logical address. The protection code 604 includes, for example, a part or all of the logical address, or information where the logical address is encoded.

In order to write data in the flash memory module P00, the storage adapter SA then attaches the protection code 604 to the write data 603 to protect it from address errors. Here, the storage adapter SA divides the data 601 into pieces so that the size of each piece of divided write data 603 in combination with its protection code 604 matches the size of each page data section in the write destination flash memory module P00. But in the foregoing specific example, the storage adapter SA adjusts the boundaries of the write data 603 so that the data 601, which is managed in 520-byte units in the cache memory CM, and its protection code 604 together will be 2048 bytes. The storage adapter SA then transfers the write data 603 and protection code 604, which have been adjusted in size to match the page data section size in the flash memory module P00, to the flash memory module P00 (Step 605).

Having received the write data 603, the memory controller MC refers to the address translation table 606 and obtains the write destination physical address. According to the address translation table 606 in this example, the logical address 'A0' is associated with the physical address 'b0' and the logical address 'A1' is associated with the physical address 'b1.' The memory controller MC writes the write data 603 and protection code 604 it receives from the storage adapter SA in the page data section having the physical address 'b0' (Step 607).

The memory controller MC handles the protection code 604 as data and writes it in the flash memory MEM. When a SCSI protocol is used, the memory controller MC carries out write operations based on write destination logical address information it received in addition to a Write command. Likewise, it carries out read operations based on read source logical address information it received in addition to a read command.

More specifically, because the flash memory module in this embodiment functions as a hard disk drive interface-compatible device, the logical address information the memory controller MC receives in addition to a command is a sector address in the case where one sector capacity is 512 bytes same as a hard disk drive which do not require high reliability. When the memory controller MC accesses the flash memory, it translates the received sector address to a logical address, and further to a physical address. Regarding translation of a sector address to a logical address in this embodiment, because the size of a page data section (2048 bytes) is an integral multiple (×4) of the sector size (512 bytes), the sector addresses corresponding to a start page-data section=logical address×4. Sector addresses are used only for data transfer between the storage channel interface and flash memory module, accordingly, explanations for them will be omitted.

Incidentally, the reference numeral 608 shows the page having physical address 'b0' and reference numeral 609 shows the page having physical address 'b1.' The reference numeral 610 shows redundant sections used by the memory controller MC.

Figure 7:
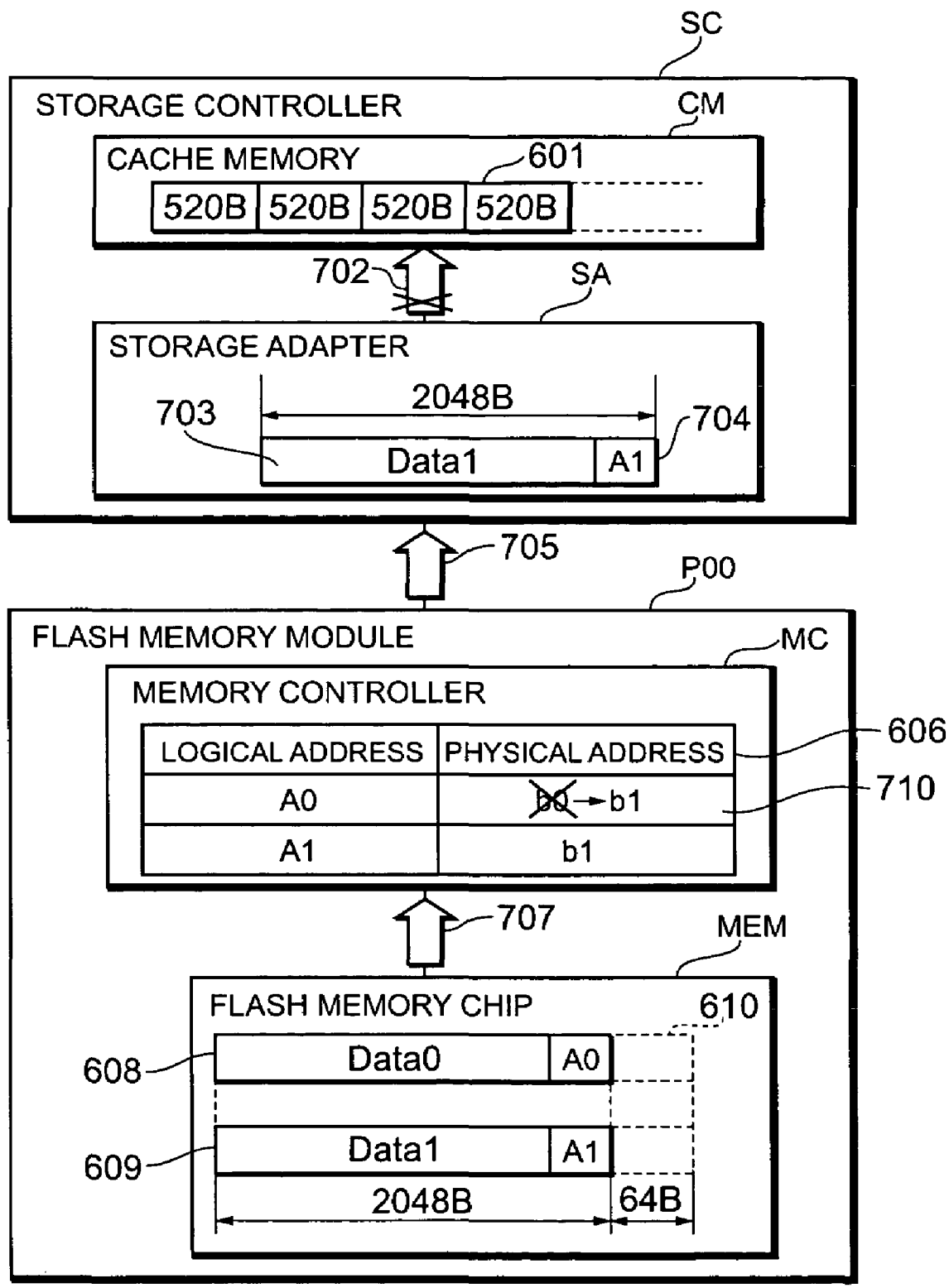
FIG. 7 is an explanatory diagram showing the outline of processing performed by the storage controller to detect an address error when it occurs in a flash memory module.

FIG. 7 shows the outline of the processing the storage controller SC performs to detect an address error when it occurs inside the flash memory module P00. In the following description, the case where the logical address 'A0' must be associated with the physical address 'b0' but this physical address 'b0' is mistakenly replaced with 'b1' in the address translation table 606 (Step 710) is explained.

The storage controller SC tries to read the data in the page data section corresponding to the logical address 'A0' but because there is an address error in the address translation table 606, the memory controller MC reads the data in the page data section having the physical address 'b1' (Step 707) and transfers it to the storage adapter SA (Step 705).

The storage adapter SA then checks the protection code 704 attached to the data 703 read from the flash memory module P00. More precisely, the storage adapter SA compares the logical address information 'A1' identified with the protection code 704 attached to the read data 703 with the logical address 'A0,' which is where the storage adapter SA requested the memory controller MC to read data from; and checks whether the data 703 is being read correctly. Because the address translation table 606 has an address error, the logical address information 'A1' identified with the protection code 704 does not match the logical address 'A0,' which is where the storage adapter SA requested the memory controller MC to read data from. That is how the storage adapter SA can detect the address error. When the storage adapter SA detects an address error, it does not store read data 703 in the cache memory CM (Step 702) because it is not the data that was intended to be read.

Figure 8:
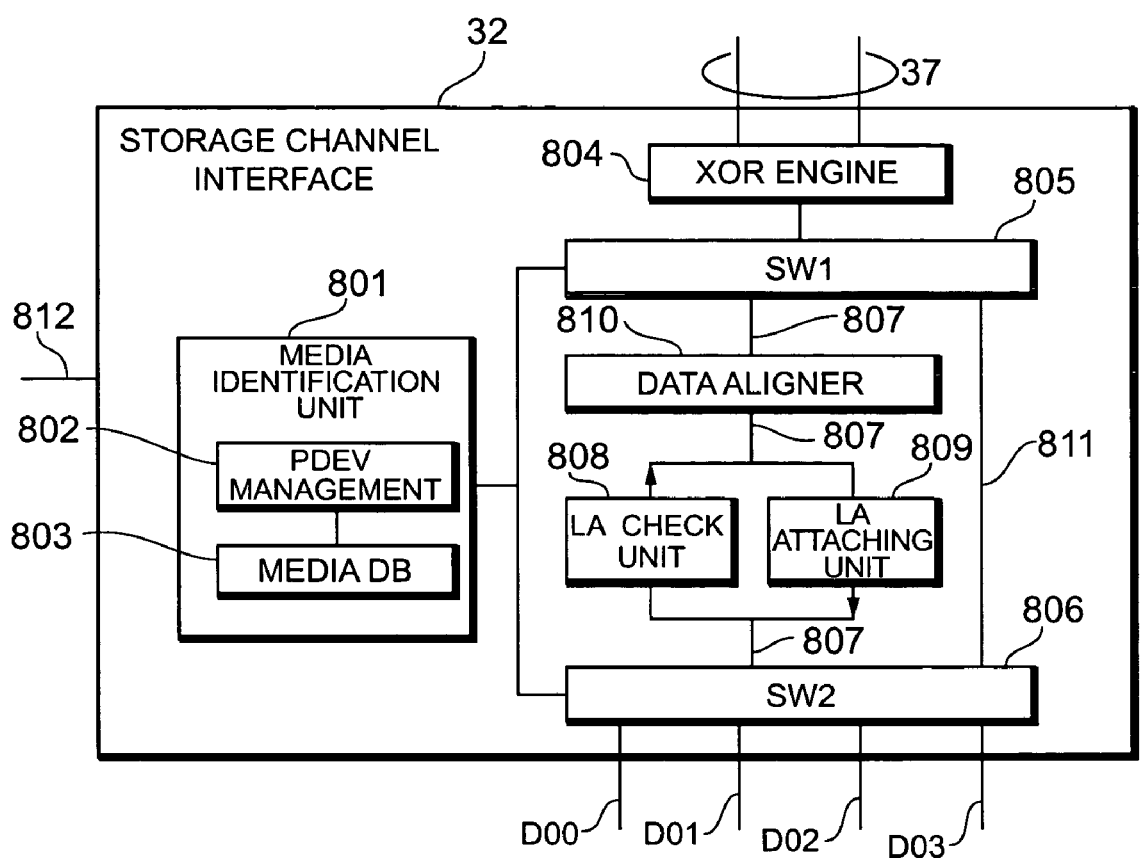
FIG. 8 is a diagram showing the hardware structure of a storage channel interface.

FIG. 8 shows the hardware structure of the storage channel interface 32. This storage channel interface 32 has a function that attaches a protection code to write data and detects an address error in read data. It has a media identification unit 801, XOR engine 804, switch (SW1) 805, switch (SW2) 806, protection code check unit (LA check unit) 808, protection code attaching unit (LA attaching unit) 809, and data aligner 810.

The storage channel interface 32 is connected to the processor peripheral control unit 36 (see FIG. 3) via the channel 812. The media identification unit 801 has the information for identifying the types of storage media connected to the storage system 10 and the information for calculating write destination logical addresses. More precisely, the media identification unit 801 has a media database 803 and PDEV management table 802. Details of the media database 803 and PDEV management table 802 will be provided below. The XOR engine 804 creates parity data to be stored in RAID groups. It also rebuilds data that has been lost during the occurrence of an error. The XOR engine 804 is connected to both the switch 805 and signal line 37.

The switches 805 and 806 switch data input/output paths based on the result of identification by the media identification unit 801. For example, if a data write destination or data read source is a hard disk drive, the switches 805 and 806 are operated so that the channel 811 is set as a data input/output path. Meanwhile, if a data write destination or data read source is a flash memory module, the switches 805 and 806 are operated so that the channel 807 is set as a data input/output path.

If a data read source is a flash memory module, the read data passes through the protection code check unit 808 and data aligner 810. Meanwhile, if a data write destination is a flash memory module, the write data passes through the data aligner 810 and protection code attaching unit 809.

The switch 806 is connected to the channels D00 to D03. To write data in a flash memory module, the data aligner 810 adjusts the boundaries of data, which is managed in 520-byte units in the cache memory CM, so that the size of the data including the protection code matches the size of the page data section. Meanwhile, to read data from a flash memory module, the data aligner 810 removes the protection code from read data and adjusts the boundaries of the read data minus the protection code so that the size of the read data matches the management unit in the cache memory CM (i.e., 520 bytes).

Based on the information (the page data section size etc.) obtained from the media identification unit 801, the protection code attaching unit 809 creates a protection code enabling identification of the logical page address information for the write destination page in the flash memory module and attaches that protection code to the write data.

The protection code check unit 808 checks whether the logical address identified with the protection code attached to the read data matches the logical address of the data that is intended to be read.

FIG. 9 shows the information stored in the PDEV management table 802. This PDEV management table 802 manages the information regarding the storage media (PDEVs) connected to the storage system 10. The storage channel interface 32 sends inquiry commands to the respective storage media connected to the storage system 10 and, based on the responses to the inquiry commands, stores the module names 901, vendor names 902, and types 903 of the storage media in the PDEV management table 802. The storage channel interface 32 also searches the media databases 803 for media types 904 and page data section sizes 905 corresponding to the vendor names and types included in the responses to the inquiry commands and stores them in the PDEV management table 802. With the PDEV management table 802, the storage channel interface 32 can be aware of the types and page data section sizes (or sector capacities) of the storage media connected to the storage system 10.

FIG. 10 shows the information stored in the media database 803. This media database 803 stores vendor names 902, types 903, media types 904, and page data section sizes 905 of the storage media (e.g., flash memory modules and hard disk drives) that may be possibly connected to the storage system 10. The media type 904 is information for identifying whether storage media is a flash memory module or hard disk drive. If the storage media is a flash memory module, '1' is entered in the media type 904 box. Meanwhile, if the storage media is a hard disk drive, '0' is entered in the media type 904 box. When the storage medium is a hard disk drive, the capacity of one sector is entered in the page data section size 905 box.

Incidentally, the administrator can modify the existing data in the media database 803 or add more information using the maintenance terminal SVP (see FIG. 1). By adding information for a new, unregistered type of flash memory module to the media database 803, when writing data in the new type of flash memory module, a protection code enabling identification of a write destination logical address can be attached to the data.

Figure 11:
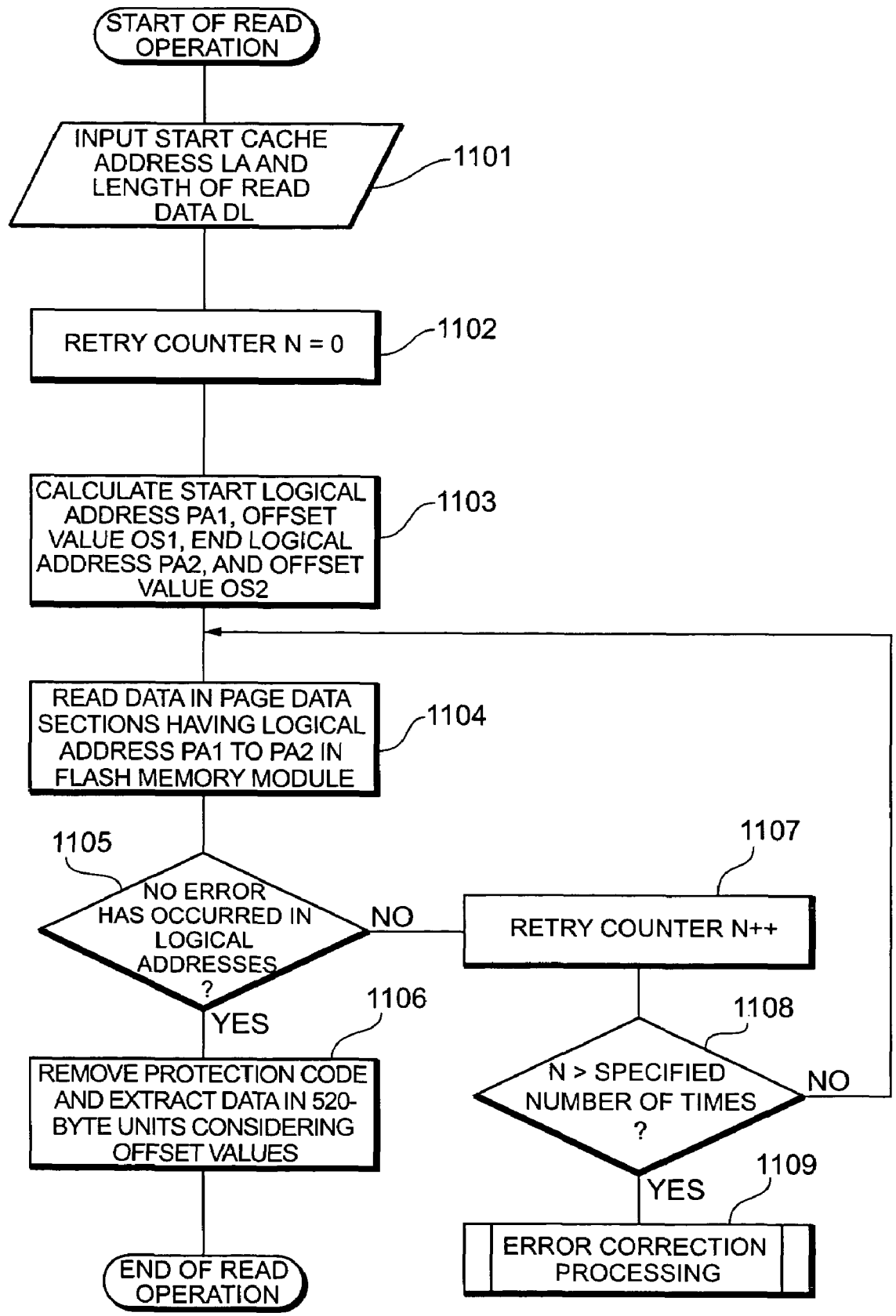
FIG. 11 is a flowchart showing a data read processing routine performed by the storage controller.

FIG. 11 is a flowchart showing a data read processing routine performed by the storage controller SC. First, the storage controller SC inputs a read source cache address LA and read data length DL in the storage channel interface 32 (Step 1101).

The storage channel interface 32 then resets the retry counter (Step 1102).

Next, the storage channel interface 32 calculates the range of logical addresses in the read source flash memory module (start logical address PA1, offset value OS1, end logical address PA2, and offset value OS2) (Step 1103). The method for calculating these addresses and values will be described below.

The storage channel interface 32 then reads the data (i.e., the data stored in the areas ranging from the start logical address PA1 to the end logical address PA2) from the flash memory module (Step 1104).

Then, the storage channel interface 32 compares the logical address identified with the protection code attached to the read data with the logical address of the data that is intended to be read; and checks whether or not an address error has occurred (Step 1105). Here, if no address error is found (Step 1105; Yes), the processing proceeds to Step 1106, but if an address error is found (Step 1105; No), it proceeds to Step 1107.

If no address error has occurred, the storage channel interface 32 removes the protection code from the read data and adjusts the boundaries of the data so that the data size matches the management unit in the cache memory CM (Step 1106). The storage channel interface 32 then stores the data in the cache memory CM and completes the read operation.

Meanwhile, if an address error has occurred, the storage channel interface 32 increments the retry counter by one (Step 1107) and, if the retry counter value has not reached a specified number (Step 1108; No), it repeats the data read operation (Step 1104). When the value in the retry counter exceeds the specified number of times (Step 1108; Yes), the storage channel interface 32 executes error correction processing (Step 1109).

Figure 12:
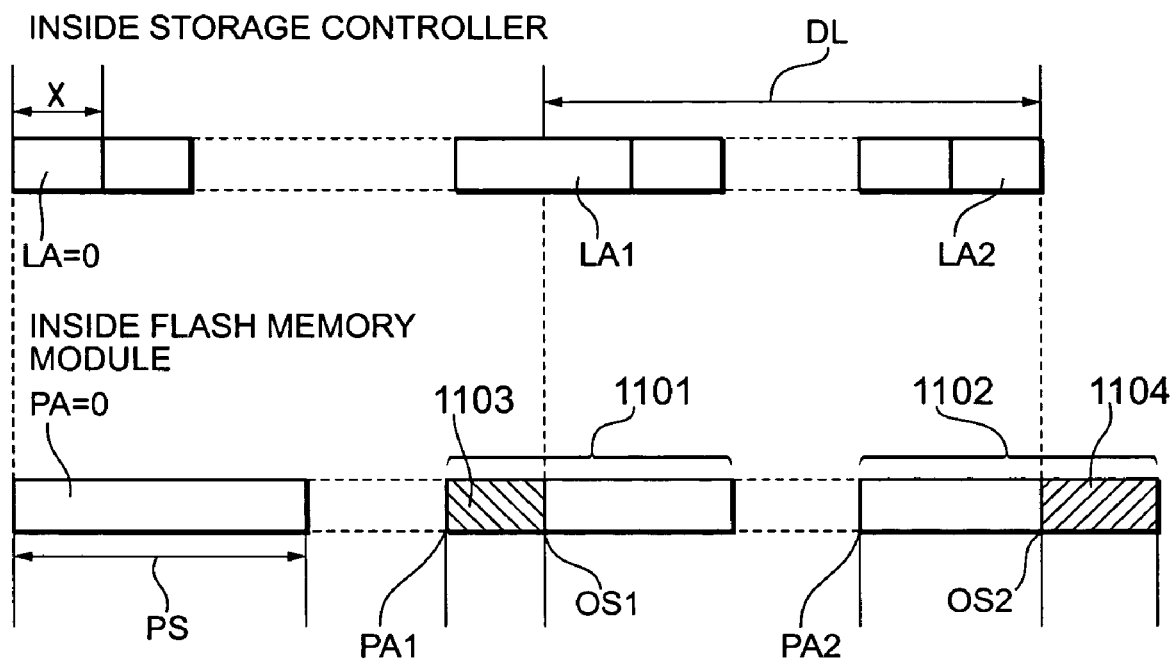
FIG. 12 is an explanatory diagram showing a method for converting a cache address to a logical address.

FIG. 12 shows a method for translating a cache address to a logical address. A start logical address PA1, offset value OS1, end logical address PA2 and offset value OS2 are calculated using the formulas (1) to (4) below.

$$PA1 = \text{int}\{(LA1*X)/(PS-Y)\} \qquad (1)$$

$$PA2 = \text{int}[\{(LA1+DL)*X-1\}/(PS-Y)] \qquad (2)$$

$$OS1 = LA1*X - PA1*(PS-Y) \qquad (3)$$

$$OS2 = (LA1+DL)*X - 1 - PA2*(PS-Y) \qquad (4)$$

Here, X is a unit for data management in the cache memory, LA1 is the start cache address of the read/write range, LA2 is the end cache address of the read/write range, DL is the size of read/write data, PS is the size of a page data section in a flash memory module, and Y is the size of a protection code. Incidentally, the example shown in FIG. 12 is for where data is located at the start address side in the page data section and a protection code is located at the end address side in the page data section; however, the locations of the data and protection code are not limited to these places.

For ease of explanation, FIG. 12 shows the memory space in the cache memory and that in the flash memory module so that the cache address LA=0 in the cache memory and the logical address PA=0 in the flash memory module are aligned. PA1 is the logical address of the start page data section 1101 in a flash memory module from/to which data is written/read. PA2 is the logical address of the end page data section 1102 in the flash memory module from/to which the data is to be written/read.

Because the cache memory and a flash memory module manage data in different units, the size of the access target data ranging from PA1 to PA2 in the flash memory module is larger than the size of the target read/write data DL in the cache memory. In this specification, the surplus parts of the data in the flash memory module are called offsets. The start page data section 1101 has an offset 1103. The end page data section 1102 has an offset 1104. OS1 and OS2 are addresses in the page data sections. The space from the address LA1 to address LA2 in the cache memory corresponds to the space from the address OS1 in the start page data section 1101 (i.e., the page data section identified by the logical address PA1) to the address OS2 in the end page data section 1102 (i.e., the page data section identified by the logical address PA2) in the flash memory module.

The storage controller SC reads the data in the whole page data sections including the offsets 1103 and 1104 in the flash memory module; removes the offsets 1103 and 1104 from the data; and stores the read data in the cache memory.

Incidentally, if the media database 803 stores, for the respective storage media having different specifications, address translation formulas such as the formulas (1) to (4) for translating logical addresses to physical address or vice versa, it is easy to handle storage media with different address translation styles.

Figure 13:
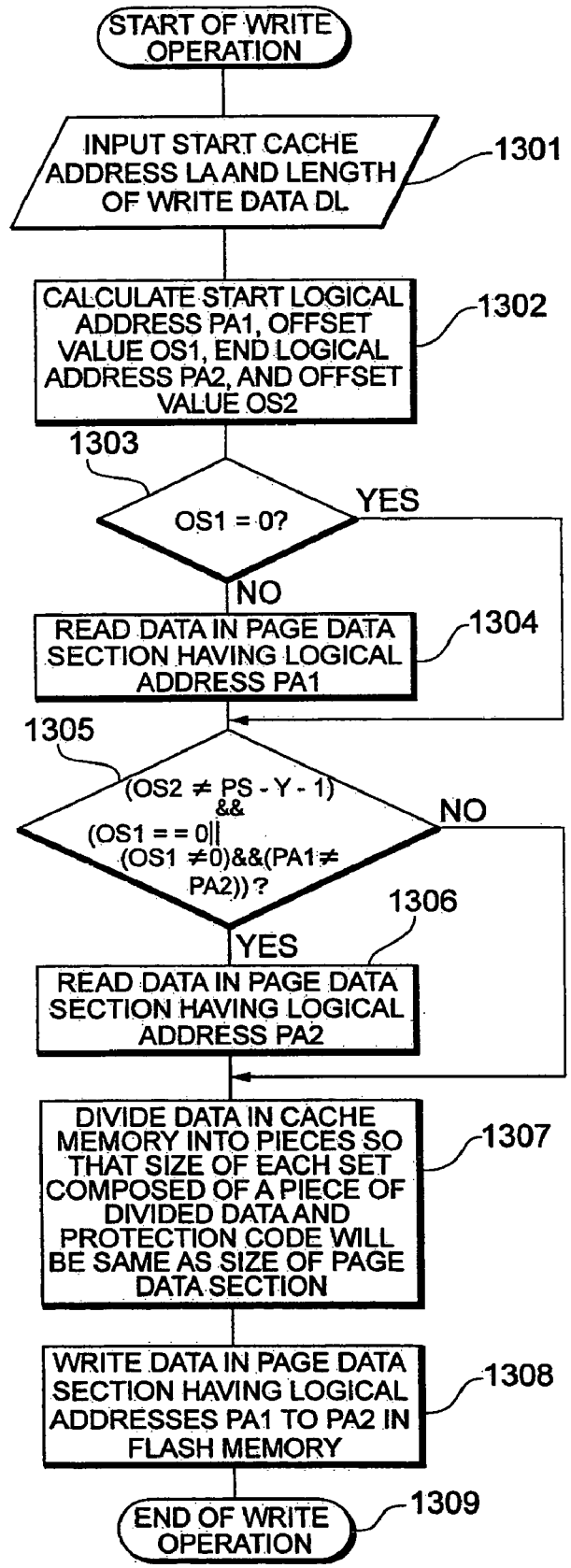
FIG. 13 is a flowchart showing a data write processing routine performed by the storage controller.

FIG. 13 depicts a flowchart showing a data write processing routine performed by the storage controller SC. First, the storage controller SC inputs, in the storage channel interface 32, the start cache address LA of a write destination and the size DL of the write data (Step 1301).

Based on the formulas (1) to (4), the storage controller SC calculates the range of logical addresses for the write destination in a flash memory module (start logical address PA1, offset value OS1, end logical address PA2, and offset value OS2) (Step 1302).

Then, the storage controller SC checks whether the start page data section 1101 has an offset 1103 or not (in other words, whether or not OS1=0) (Step 1303).

If the start page data section 1101 has an offset 1103 (Step 1303; No), the storage controller SC reads the data in the start page data section 1101 (Step 1304). Meanwhile, if the start page data section 1101 does not have an offset 1103 (Step 1303; Yes), the storage controller SC proceeds to Step 1305.

The storage controller SC then checks whether the end page data section 1102 has an offset 1104 (i.e., whether OS2; PS−Y−1) and whether the data in the end page data section has not been read yet (i.e., OS1==O∥(OS1≠0 && PA1≠PA2)) (Step 1305).

If the end page data section 1102 has an offset 1104 and the data in the end page data section has not been read yet (Step 1305; Yes), the storage controller SC reads the end page data section 1102 (Step 1306). Meanwhile, if the end page data section 1102 does not have an offset 1104 or the data in the end page data section has already been read (Step 1305; No), the storage controller SC proceeds to step S1307.

When the storage controller SC has read the start page data section 1101 or end page data section 1102, it does not update the data in the offsets 1103 and 1104 but updates the data except for the offsets 1103 and 1104 to the write data in the cache memory CM. The storage controller SC then attaches a protection code enabling identification of the write destination logical address to the data in cache memory and adjusts the boundaries of that data so that the data size including the protection code matches the page data section size (Step 1307).

The storage controller SC then transfers the write data from the start logical address PA1 to the end logical address PA2 to the flash memory module (Step 1308) and completes the write processing.

Figure 14:
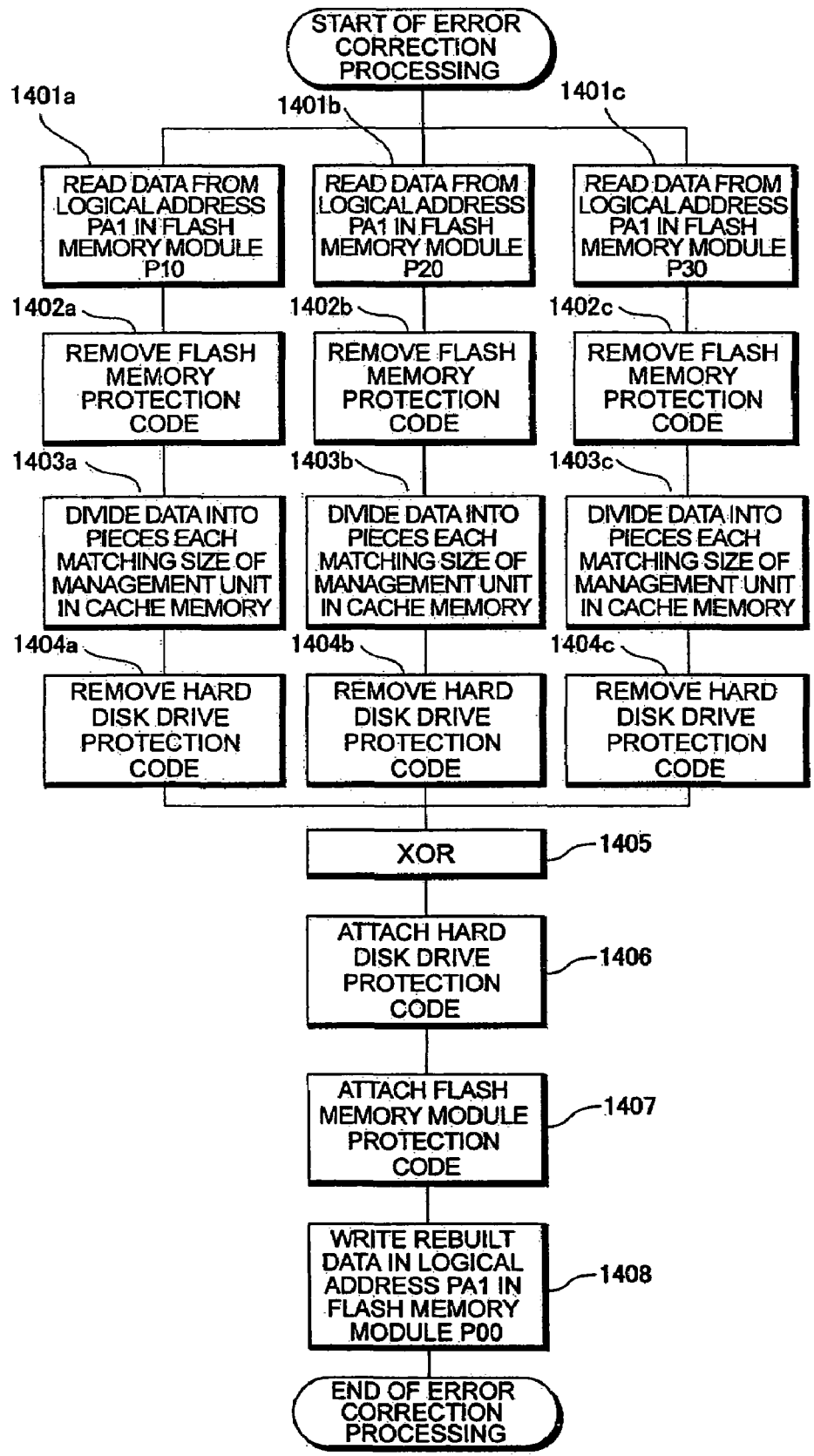
FIG. 14 is a flowchart showing error correction processing performed by the storage channel interface.

FIG. 14 is a flowchart showing error correction processing performed by the storage channel interface 32. As an example, the case where an address error occurs in the logical address PA1 in the flash memory module P00 belonging to the RAID group VDEV 0 consisting of the flash memory modules P00, P10, P20 and P30 is discussed.

The storage channel interface 32 reads data from the logical address PA1 in the flash memory modules P10, P20 and P30 belonging to the same RAID group VDEV 00 as the flash memory module P00 (Step 1401a, 1401b, and 1401c).

Then, the storage channel interface 32 removes the flash memory protection code enabling identification of the logical address from the data that has been read (Step 1402a, 1402b, and 1402c).

The storage channel interface 32 then divides the data that has been read into pieces so that the size of each piece of divided data matches the management unit in the cache memory (Step 1403a, 1403b, and 1403c).

The storage channel interface 32 then removes a hard disk drive protection code from each piece of data whose size matches the management units in the cache memory (Steps 1404a, 1404b, and 1404c).

Then, the XOR engine 804 calculates exclusive OR for the data minus the flash memory protection code and hard disk drive protection code, and rebuilds the data that must have been stored in the flash memory module P00 (Step 1405).

Then, the storage channel interface 32 attaches a hard disk drive protection code to the rebuilt data (Step 1406).

Next, the storage channel interface 32 also attaches a flash memory module protection code (information enabling identification of the write destination logical address PA1) to the rebuilt data; and adjusts the boundaries of the data so that the size of each piece of data matches the page data section size (Step 1407).

The storage channel interface 32 then writes the rebuilt data in the logical address PA1 in the flash memory module P00 (Step 1408), completing the error correction process.

Incidentally, when an address error occurs in a hard disk drive, the storage controller SC overwrites/corrects the data having the address error in units of a first data length.

Figure 15:
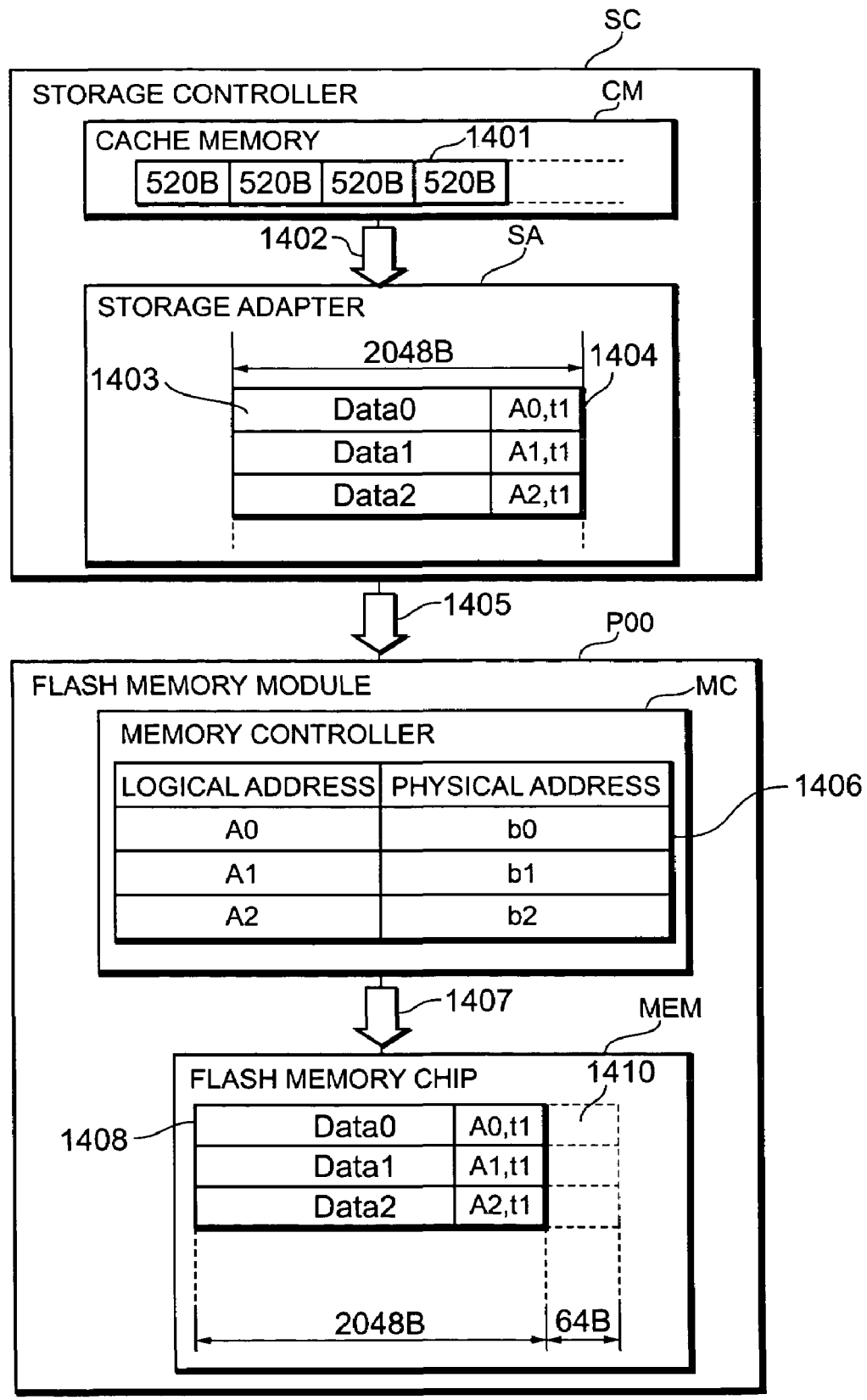
FIG. 15 is a diagram explaining the operations performed, when data writing, by the storage controller to add a different type of protection code to data to protect it from address errors.

FIG. 15 is a diagram explaining operations the storage controller SC performs during data writing to attach a different type of protection code to data protect it from address errors. For example, when the storage controller SC writes sequential access data in the flash memory module P00, it attaches, to the sequential access data, protection codes including write-time information.

In the cache memory CM in the storage controller SC, data 1401 is managed in units of sectors in hard disk drive sectors (e.g., in 520-byte units). When the storage controller SC writes data in the flash memory module P00, it transfers the data 1401 in the cache memory CM to the storage adapter SA (Step 1402).

The case where the storage adapter SA writes sequential data 1403 in the logical addresses A0 to A2 in the write destination flash memory module P00 is discussed below. The storage adapter SA creates protection codes 1404 enabling identification of the write destination logical addresses A0 to A2 and the write-time information 't1'. The storage adapter SA then transfers the pieces of the write data 1403 and their protection codes 1404, the size of each set being adjusted to match the page data section size, to the flash memory module P00 (Step 1405).

Having received the write data, the memory controller MC refers to the address translation table 1406 and translates the physical addresses of the write destination. According to the address translation table 1406, logical addresses A0 to A2 correspond to physical addresses b0 to b2, respectively. The memory controller MC stores the pieces of write data together with their protection codes enabling identification of the logical addresses A0 to A2 and write-time information t1, in the page data sections 1408 having the physical addresses b0 to b2, respectively.

Incidentally, the reference numeral 1410 shows the redundant sections used by the memory controller MC.

Figure 16:
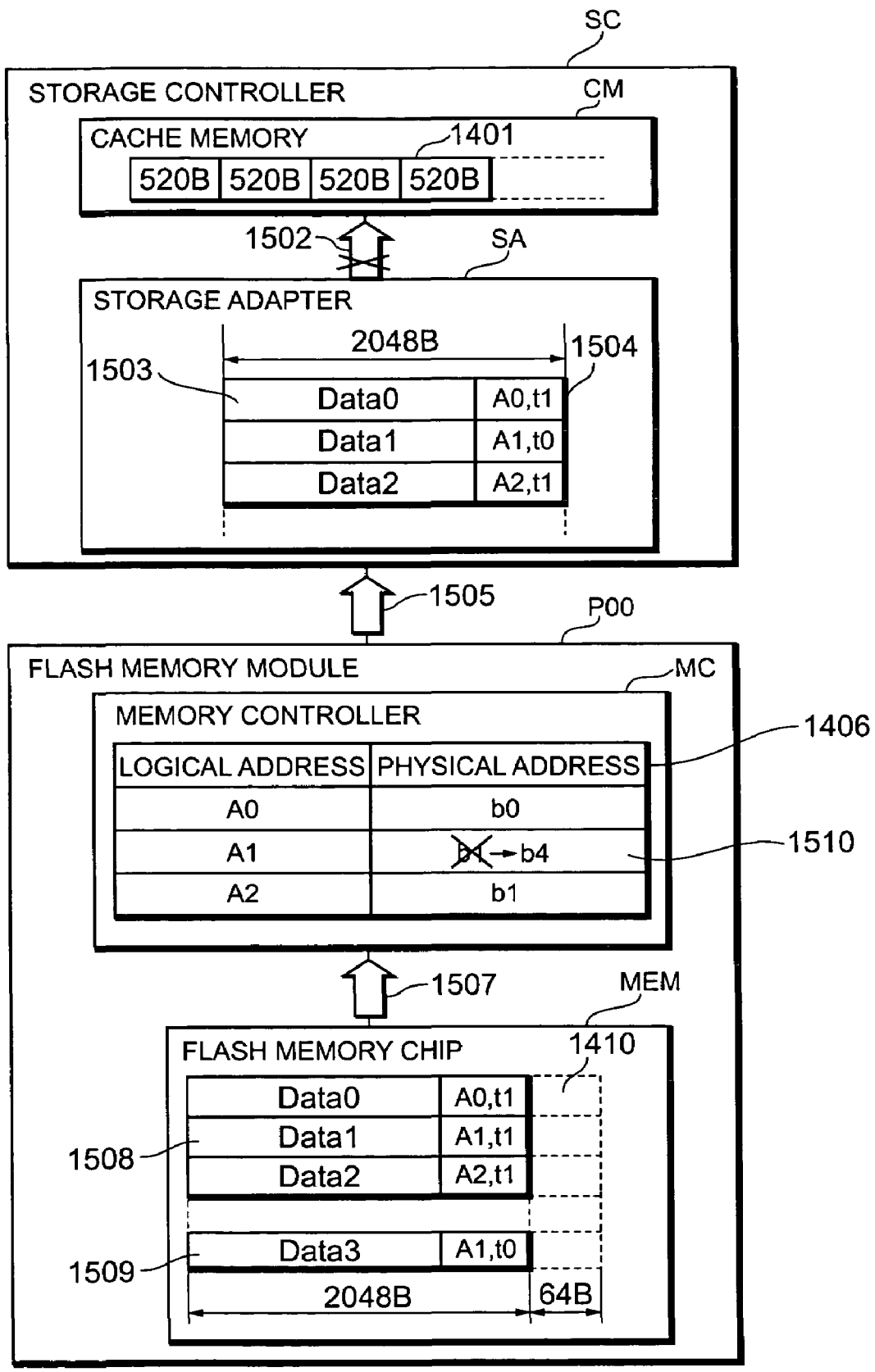
FIG. 16 is a diagram explaining the operations performed, when an address error occurs in a flash memory module, by the storage controller to detect the address error based on a protection code including write-time information.

FIG. 16 is a diagram explaining operations the storage controller SC performs to detect an address error based on protection codes including write-time information when an address error occurs in a flash memory module. Here, the case where the logical address A1 should be associated with the physical address b1 in the address translation table 1406, but where the physical address b1 is mistakenly replaced by b4 (Step 1510) and the physical address b4 stores the old data in the logical address A1 (write-time information t0), is discussed.

Incidentally, the reference numeral 1508 shows the page having the physical address b1 and the reference numeral 1509 shows the page having physical address b4. The reference numeral 1410 shows the redundant sections used by the memory controller MC.

The storage controller SC tries to read the sequential data in the logical addresses A0 to A2. However, even if the storage controller SC tries to read the data stored in the page data section in the logical address A1, due to the address error in the address translation table 1406, the memory controller MC reads data in the page data section in the wrong physical address b4 (Step 1507) and transfers that data to the storage adapter SA (Step 1505).

The storage adapter SA then checks the protection code 1504 attached to the received data 1503. However, because the protection code contained in the data read from the physical address b4 identifies the logical address A1, the storage adapter cannot detect an address error just by checking the logical address.

However, because the pieces of sequential data read from the logical addresses A0 to A2 respectively are those that have been written at the same time, their protection codes 1504 must identify the same time information t1. Accordingly, by discovering the unmatched time information t0, the storage adapter SA can detect an address error.

Data found to have been involved in an address error is not to be stored in the cache memory CM (Step 1502).

As described above, when sequential data is stored, its data reliability can be increased by having each protection code include, in addition to information enabling identification of a logical address, information enabling identification of a write-time.

Incidentally, a protection code may alternatively include, in place of write-time information, an identifier of an exchange write data belongs to or sequence identifier, or information where write-time information is encoded. It is also possible to have the storage adapter SA include a table storing relationships between the logical address information for the respective pieces of write data and the write-time information for the same so that, when reading data, the storage adapter SA can compare the write-time information identified based on the relevant data's protection codes and the corresponding records in the table.

Figure 17:
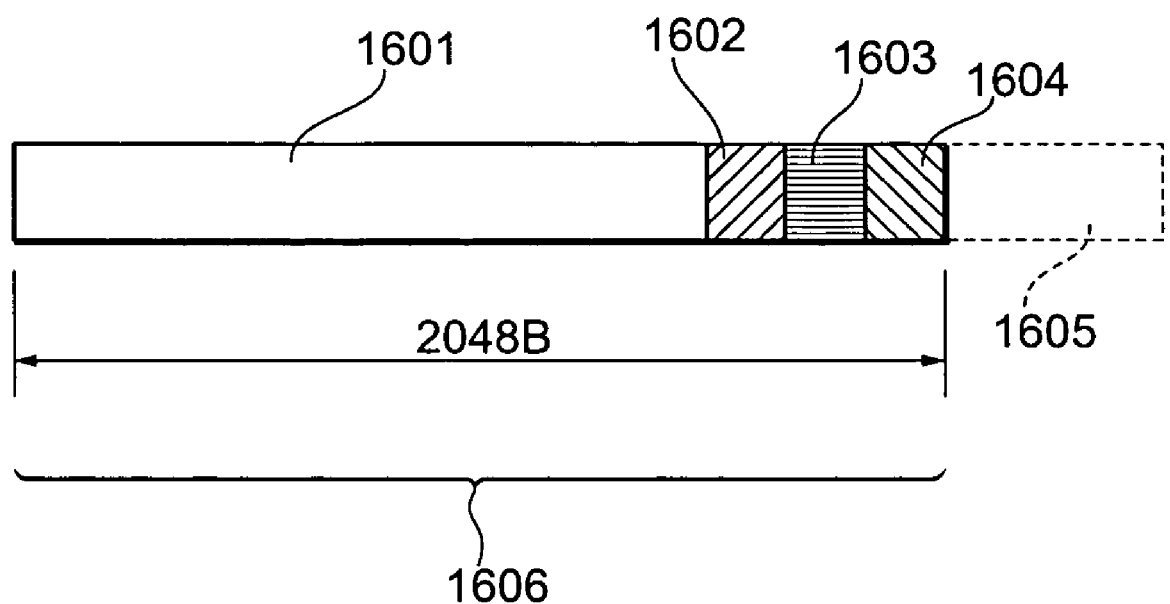
FIG. 17 is a diagram explaining an example of other different types of protection codes added to a page data section when writing data.

FIG. 17 is a diagram explaining an example of other types of protection codes attached to a page data section during writing. A page includes a page data section 1606 and redundant section 1605. Because the storage controller SC cannot read/write data in the redundant sections 1605, protection codes are written in a predetermined area in the page data section 1606, together with the data 1601. The data 1601 and the protection codes 1602, 1603 and 1604 are written in the page data section 1606.

Here, the protection code 1602 includes information enabling identification of a logical address. The protection code 1603 includes information enabling identification of a write-time. The protection code 1604 is for detecting or correcting an error in the data 1601, protection code 1602 or 1603 written in the page data section 1606. Examples of the protection code 1604 include a CRC (Cyclic Redundancy Check) code, a LRC (Longitudinal Redundancy Check) code and a Hamming code.

In a flash memory module, the memory controller MC stores a protection code for the data written in a page data section in a redundant section 1605 and the data is guaranteed by this protection code. However, the protection code in the redundant section 1605 is removed during data transfer between the memory controller MC and storage adapter SA, so a consistent data guarantee cannot be provided in both the storage adapter SA and flash memory modules. However, by writing, in addition to data and other protection codes, an error correction code in a page data section, the reliability of the storage system can be improved.

According to this embodiment, for a storage system 10 where there is a gap in capacity between the memory management unit in a storage controller SC and that in a storage medium, an address error in a storage medium can be detected and, consequently, data can be protected properly.

What is claimed is:

1. A storage system comprising:
   one or more flash memory modules each comprising one or more flash memory chips and a memory controller operable to control reading/writing of data from/to the flash memory chips; and
   a storage controller comprising cache memory operable to temporarily store data read/written from/to one or more of the flash memory chips,
   wherein,
   in the cache memory, data read/written from/to the flash memory chips is managed in units of first data lengths;
   in the flash memory modules, the data read/written from/to the flash memory chips is managed in page units;
   the memory area of one page includes a memory area of a second length from/to which the storage controller can read/write data, and a memory area for a redundant section;
   when writing data to a flash memory chip, the storage controller is operable to create a protection code enabling identification of address information for a write destination page;
   divide the data in the cache memory, which is managed in units of first data lengths, into pieces so that the size of each set composed of a piece of the divided write data and its protection code will be of the second data length, and write the respective sets of the pieces of write data and protection codes in the flash memory chip in units of second data lengths; and
   the storage controller is operable to compare the address information identified with the protection codes attached to the data read from the flash memory chip with the address information for the data that is intended to be read, and check whether or not there is an address error.

2. The storage system according to claim 1, wherein the storage controller further includes a database storing relationships between the specifications of the flash memory modules and the second data lengths of the flash memory modules.

3. The storage system according to claim 1,
   wherein the storage areas provided by flash memory modules are structured according to RAID; and
   when an address error occurs in the data in any one of the flash memory modules, the storage controller is operable to rebuild the data having the address error in units of the second data lengths using the data stored in the other flash memory modules belonging to the same RAID group as the flash memory module storing the data having the address error; and overwrite the data having the address error with the rebuilt data.

4. The storage system according to claim 1, the storage system further includes hard disk drives as storage media, wherein when an address error occurs in a hard disk drive, the storage controller is operable to overwrite/correct the data having the address error in units of the first data lengths.

5. The storage system according to claim 1, wherein any one of the protection codes includes write-time information.

6. The storage system according to claim 1, wherein any one of the protection codes includes an error detection code for protecting data of the second data length.

7. A storage system comprising:
one or more flash memory modules each comprising one or more flash memory chips and a memory controller operable to control reading/writing of data from/to the flash memory chips; and
a storage controller comprising cache memory that temporarily stores data read/written from/to one or more of the flash memory chips,
wherein,
in the cache memory, data read/written from/to the flash memory chips is managed in units of first data lengths;
in the flash memory modules, the data read/written from/to the flash memory chips is managed in page units;
the memory area of one page includes a memory area of a second length from/to which the storage controller is operable to read/write data, and a memory area for a redundant section;
the storage controller comprises a media identification unit that identifies the type of a storage medium connected thereto;
if a storage medium connected to the storage controller is a flash memory module, when writing data in a flash memory chip, the storage controller is operable to create a protection code enabling identification of address information for a write destination page; divide the data in the cache memory, which is managed in units of first data lengths, into pieces so that the size of each set composed of a piece of the divided write data and its protection code will be of the second data length, and write the respective sets of the pieces of the write data and protection code in the flash memory chip in units of second data lengths; and
the storage controller is further operable to compare the address information identified with the protection codes attached to the data read from the flash memory chip with the address information for the data that is intended to be read, and check whether or not there is an address error.

8. The storage system according to claim 7, wherein the first data length is the sector length of a hard disk drive.

9. The storage system according to claim 7, wherein data of the first data length includes data and a protection code enabling identification of address information of a write destination hard disk drive for that data.

10. The storage system according to claim 7, wherein the storage controller further includes a database storing relationships between the specifications of the storage media and the second data lengths of the storage media.

11. The storage system according to claim 7,
wherein the storage areas provided by flash memory modules are structured according to RAID; and
when an address error occurs in the data in any one of the flash memory modules, the storage controller is operable to rebuild the data having the address error in units of the second data lengths using the data stored in the other flash memory modules belonging to the same RAID group as the flash memory module storing the data having the address error; and overwrites the data having the address error with the rebuilt data.

12. The storage system according to claim 7, wherein, when an address error occurs in a hard disk drive, the storage controller is operable to overwrite/correct the data having the address error in units of the first data lengths.

13. The storage system according to claim 7, wherein any one of the protection codes includes write-time information.

14. The storage system according to claim 7, wherein any one of the protection codes includes an error detection code for protecting data of the second data length.

15. A data protection method performed in a storage system, the storage system comprising: one or more flash memory modules each comprising one or more flash memory chips and a memory controller that controls reading/writing of data from/to the flash memory chips; and a storage controller comprising cache memory operable to temporarily store data read/written from/to one or more of the flash memory chips, and the memory area of one page comprising: a memory area of a second length from/to which the storage controller can read/write data; and a memory area for a redundant section,
the method comprising:
managing the data read/written from/to a flash memory chip in units of first data lengths in the cache memory;
creating a protection code enabling identification of address information for a write destination page, when writing data in a flash memory chip;
dividing the data in the cache memory, which is managed in units of first data lengths, into pieces so that the size of each set composed of a piece of the divided write data and its protection code will be of the second data length;
writing the respective sets of the pieces of the write data and protection codes in the flash memory chip in units of second data lengths; and
comparing the address information identified with the protection codes attached to the data read from the flash memory chip with the address information for the data that is intended to be read and checking whether or not there is an address error.

* * * * *